Patented July 6, 1926.

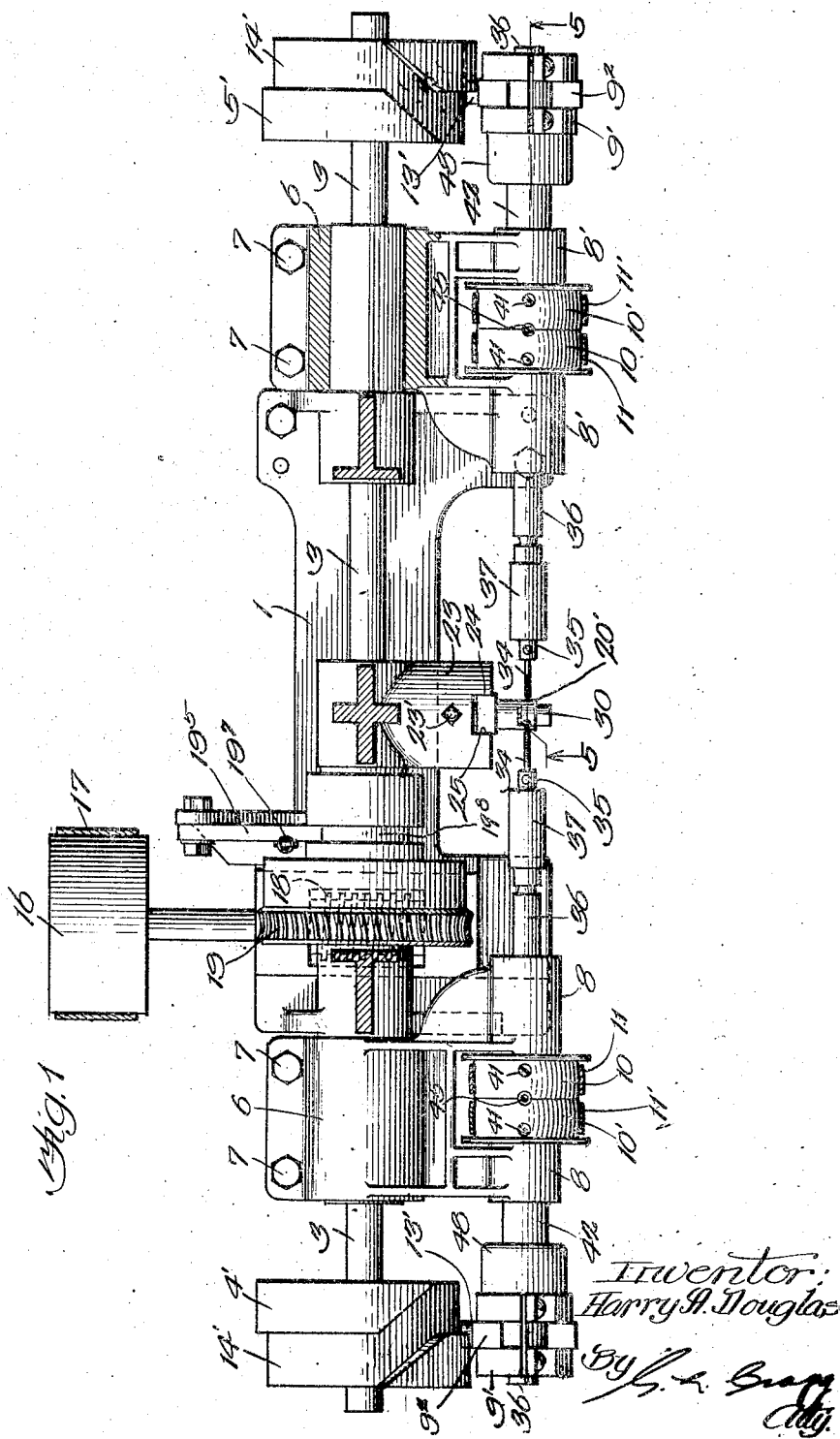

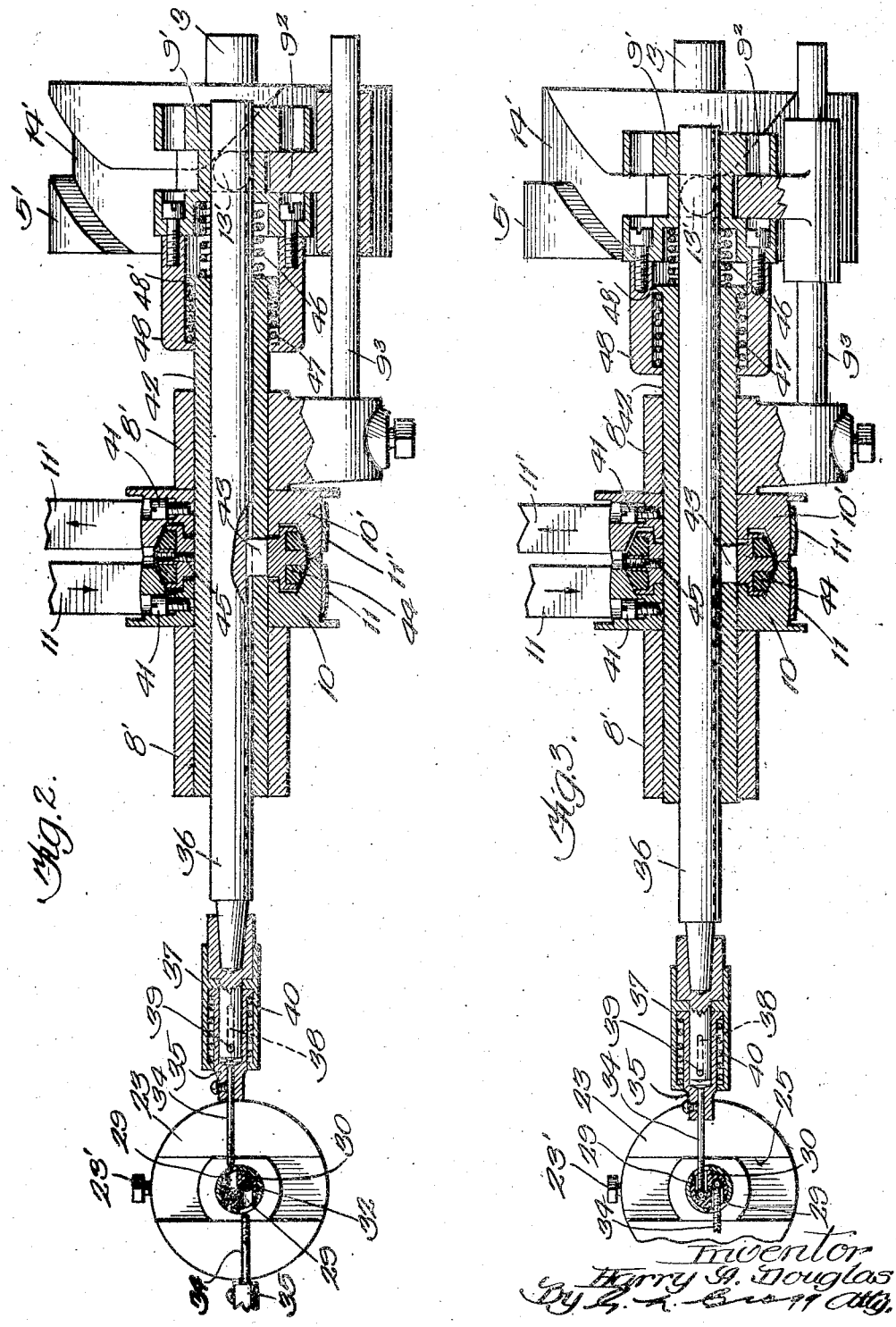

1,591,520

UNITED STATES PATENT OFFICE.

HARRY A. DOUGLAS, OF BRONSON, MICHIGAN.

TOOL.

Application filed November 1, 1923. Serial No. 672,115.

My invention relates to tools which are operated by being moved longitudinally on their axes and by being turned.

In carrying out my invention, the mechanism which moves the tool along its axis also operates the shifting member of the clutch through a spring, the spring maintaining the shifting member of the clutch in its shifted position while the tool is being advanced, and permitting the advance of the tool, the clutch being thus adjusted to turn the tool in one direction while it is being advanced. The mechanism that is employed for withdrawing the tool desirably reverses the position of the shifting member of the clutch to reverse the rotation of the tool while it is being withdrawn, a spring being interposed between the tool withdrawing mechanism and the clutch through which the withdrawing mechanism operates upon the clutch to shift the moving member thereof, this spring also performing its function without interfering with the withdrawing operation of the tool.

The invention will be more fully explained in connection with the accompanying drawings in which Fig. 1 is a plan view, partially in section; Fig. 2 is a sectional view on line 2—2 of Fig. 1; and Fig. 3 is a view similar to Fig. 2, but showing changed positions of some of the parts.

The machine includes a frame 1 provided with bearings which carry the cam shaft 3.

For the tapping operation the tool is advanced with the parts positioned as illustrated in Fig. 1, and this advance is continued until the tap 34 thereon enters the hole that is to be tapped and is turned therein sufficiently to enable the tap to find its own way through the hole without further advance of the tool. When the tap is finding its own way into the hole, the spring 40 is gradually placed under compression, the compression of the spring being completed by the withdrawing movement of the tool section 36 that is commenced as soon as the tap commences to find its own way through the corresponding hole. When the threading is completed, the tool is turned in the reverse direction until the tap clears the threaded hole, whereupon the spring 40 will snap the tool section 35 toward the tool section 36 to the initial position illustrated in Fig. 1. Each tool 35, 36 is driven in a threading direction by the belt driven pulley 10 and is turned in the opposite direction by the belt driven pulley 10'. The belt 11' may then have its direction of travel reversed so as to travel in the same direction with the belt 11 to enable both to turn together to drive the corresponding composite pulley 10 and 10'. When the tap is to be operated, both set screws 41 are loosened and the two pulleys slip upon the sleeve 42 which is in splined connection with the tool section 36, as indicated at 43, whereby the tool may be moved longitudinally of its axis while being turned by one or other of the pulleys 10, 10', which is brought into connection with the sleeve by means of the clutching device 44 which carries the spline 43 and which is further assembled with the sleeve 42 by a set screw 45. The clutching device 44 embraces two clutches, one half of this device being a clutch individual to the pulley 10, and the other half of this device being a clutch individual to the pulley 10'. The sleeve 42, itself, is permitted slight movement longitudinally of the axis of the tool in order that the clutch device may be engaged with one or the other of the oppositely rotated pulleys 10, 10'. The advancing mechanism moves the clutch into engagement with pulley 10 in order to turn the tap in a threading direction. This mechanism also operates to withdraw the tool, and then shifts the clutch into engagement with the pulley 10' which will turn the tap in an opposite direction. The tool advancing mechanism includes cam wheels 4' or 5' and the cam roller 13', each tool section 36 turning in the collar 9' receiving the fork 9² that carries the cam roller 13'. A spring 46 is interposed between one end of sleeve 42 and the adjacent end of the adjacent collar 9' at the adjacent or outer end of the sleeve 42, this spring moving said sleeve longitudinally and bringing the clutch 44 that is fixed on the sleeve into engagement with the pulley 10 to turn the tap in a threading direction, the spring yielding to permit further advance of the tapping tool while maintaining the clutch and the pulley 10 in engagement. Spring 47 is interposed between said collar and sleeve in a manner to reverse the clutch to withdraw the tool. The outer end of the spring 47 engages the flange 48' upon the sleeve 42 thereby to press upon the sleeve oppositely to the spring 46, the inner end of the spring 47 pressing upon the end wall of the sleeve continuation 48 of the adjacent cam controlled tool collar 9' into which sleeve 48 the sleeve 42 projects, the sleeve 48 being assembled with the tool section 36 to move therewith. Springs 46 and 47 thus constitute yielding means through which the clutch member 44 is shifted by the cam to advance or withdraw the tool employed.

While the machine illustrated drills and taps, the invention is not to be limited to these functions. The operation of one-half of the machine has been specifically described. The operation of the machine as a whole will now be more generally described. The work 30 is carried in the holder 20' midway between the bearings 8' whose axes are offset but parallel and intersect the work coincidentally with the axes of the offset holes 29 that are to be formed in the work. The taps 34 are turned, one upon each of these axes, and are caused to simultaneously move inwardly and approach each other to enter the work from opposite sides or to be simultaneously moved outwardly and away from each other to be withdrawn from the work. The tools are carried by and are movable oppositely along the sleeves with which they are in splined connection so as to turn therewith while being movable therealong. These sleeves are turned by the pulleys 10, 10' alternately in opposite directions to turn the tools in working directions or withdrawing directions and the tools themselves are advanced or withdrawn, while turning, by the cams 5' operating through the collars 9' upon the tools. When the cams are turned to impart longitudinal working movement to the tools, the sleeves 42 are moved inwardly thereby through the agency of said collars 9' and through the springs 46, the sleeves then shifting the clutch members 44 into coupling engagement with the pulleys 10, to turn the tools in working directions. When the cams operate to reverse the movements of the tools they move said sleeves 42 outwardly through said collars 9' and through the springs 47 to couple the clutches with pulleys 10' that rotate reversely to pulleys 10, to turn the tool in a withdrawing direction. The springs 46, 47 maintain the clutch adjustments they effect while the cam operated tool collars 9' are moved inwardly or outwardly to impart continuing longitudinal movement to the tools.

Having thus described my invention I claim as new and desire to secure by Letters Patent the following:—

1. The combination with a rotatable and longitudinally movable sleeve; of a tool operating shaft within and movable longitudinally of the sleeve and coupled to turn therewith; a clutch member fixed upon the sleeve; oppositely rotating clutch members, each complemental to the first aforesaid clutch member and engageable therewith according to the direction of longitudinal movement of said sleeve; a cam means operated by the cam and in longitudinal moving relation to the shaft; a spring in thrusting engagement with the sleeve to move it longitudinally in one direction; a second spring in thrusting engagement with the sleeve to move it longitudinally in the reverse direction; means operating upon one spring and operated by the cam to cause this spring to exert thrusting action upon the sleeve in one longitudinal direction; and means operating upon the other spring and operated by the cam to cause this other spring to exert thrusting action upon the sleeve in the other longitudinal direction.

2. The combination with a rotatable and longitudinally movable sleeve; of a tool operating shaft within and movable longitudinally of the sleeve and coupled to turn therewith; a clutch member fixed upon the sleeve; oppositely rotating clutch members, each complemental to the first aforesaid clutch member and engageable therewith according to the direction of longitudinal movement of said sleeve; a cam means operated by the cam and in longitudinally moving relation to the shaft in one direction; a spring in thrusting engagement with the sleeve to move it longitudinally in one direction; a second spring in thrusting engagement with the sleeve to move it longitudinally in the reverse direction; means operating upon one spring and operated by the cam to cause this spring to exert thrusting action upon the sleeve in one longitudinal direction; and means operating upon the other spring and operated by the cam to cause this other spring to exert thrusting action upon the sleeve in the other longitudinal direction, the cam operated means for moving the shaft longitudinally and the two cam operated means for operating the springs being in one unitary structure.

In witness whereof, I hereunto subscribe my name this 24th day of October A. D., 1923.

HARRY A. DOUGLAS.